United States Patent
Charles et al.

(10) Patent No.: US 10,789,320 B2
(45) Date of Patent: Sep. 29, 2020

(54) SYSTEM AND METHOD FOR GENERATING GLOBALLY-UNIQUE IDENTIFIERS

(71) Applicant: Walmart Apollo, LLC, Bentonville, AR (US)

(72) Inventors: Kevin M. Charles, Bentonville, AR (US); Richard T. Jackson, Bentonville, AR (US); John Randy Frerking, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 650 days.

(21) Appl. No.: 15/533,267

(22) PCT Filed: Dec. 3, 2015

(86) PCT No.: PCT/US2015/063721
§ 371 (c)(1),
(2) Date: Jun. 5, 2017

(87) PCT Pub. No.: WO2016/090133
PCT Pub. Date: Jun. 9, 2016

(65) Prior Publication Data
US 2017/0364601 A1    Dec. 21, 2017

Related U.S. Application Data

(60) Provisional application No. 62/088,414, filed on Dec. 5, 2014.

(51) Int. Cl.
*G06F 17/00* (2019.01)
*G06F 16/955* (2019.01)
(Continued)

(52) U.S. Cl.
CPC ........... *G06F 16/955* (2019.01); *G06Q 10/10* (2013.01); *H04L 67/32* (2013.01)

(58) Field of Classification Search
CPC ....... G06F 16/955; G06F 16/90; G06Q 10/10; H04L 67/32
See application file for complete search history.

(56) References Cited

U.S. PATENT DOCUMENTS

| 5,913,217 A | 6/1999 | Alger |
| 7,024,394 B1 | 4/2006 | Ashour |

(Continued)

FOREIGN PATENT DOCUMENTS

| EP | 1077414 | 2/2001 |
| EP | 1202187 | 5/2002 |

OTHER PUBLICATIONS

International Preliminary Report on Patentability, Application No. PCT/US2015/063721, dated Jun. 6, 2017, 10 pages.

(Continued)

*Primary Examiner* — Tyler J Torgrimson
(74) *Attorney, Agent, or Firm* — Patterson Thuente Pedersen, P.A.

(57) ABSTRACT

A system and method for producing a new globally-unique identifier (GUID) format that may be used, for instance, to uniquely identify a number of different items in a distributed computer system, such as transactions in an e-commerce system, sessions in a cloud-based computing system, and identifiers for unique customers in an ecommerce system, among others. The unique ID may have one of a number of different formats that may be generated upon receiving a request for an ID. For instance, the GUID may be generated in a plain hex format, a GUID format, ESS, and B64B (Base64Binaty) format. The new format may be generated based on information relating to a site ID, an absolute time, and a sequential counter, that ensures that no two GUIDs are the same. Further, the system may be capable of issuing (Continued)

multiple GUIDs within a single command, such as may be required to generate an array of GUIDs.

20 Claims, 13 Drawing Sheets

(51) Int. Cl.
*G06Q 10/10* (2012.01)
*H04L 29/08* (2006.01)

(56) References Cited

U.S. PATENT DOCUMENTS

| | | |
|---|---|---|
| 7,111,291 B2 | 9/2006 | Loy |
| 7,720,686 B2 | 5/2010 | Volk |
| 7,739,512 B2 | 6/2010 | Hawkes |
| 8,255,247 B2 | 8/2012 | Messer |
| 8,553,867 B2 | 10/2013 | Callanan |
| 8,583,790 B2 | 11/2013 | Nalla |
| 8,671,025 B2 | 3/2014 | Mehra |
| 8,782,014 B2 | 7/2014 | Shepard |
| 9,706,012 B2 | 7/2017 | Tanimoto |
| 9,769,368 B1 | 9/2017 | Morford |
| 2001/0034668 A1 | 10/2001 | Whitworth |
| 2002/0111870 A1 | 8/2002 | Chinnappan |
| 2003/0016250 A1 | 1/2003 | Chang |
| 2003/0036997 A1 | 2/2003 | Dunne |
| 2003/0069878 A1 | 4/2003 | Wise |
| 2004/0187015 A1 | 9/2004 | Geer |
| 2005/0210019 A1 | 9/2005 | Uehara |
| 2005/0262075 A1 | 11/2005 | Beartusk |
| 2006/0122915 A1 | 6/2006 | Allen |
| 2006/0136511 A1* | 6/2006 | Ngo .................. G06F 17/2288 |
| 2007/0067179 A1 | 3/2007 | Kerr |
| 2007/0143082 A1 | 6/2007 | Degnan |
| 2007/0180468 A1 | 8/2007 | Gill |
| 2008/0071559 A1 | 3/2008 | Arrasvuori |
| 2009/0043864 A1 | 2/2009 | Shetty |
| 2009/0094315 A1 | 4/2009 | Nadel |
| 2009/0016899 A1 | 7/2009 | Banga |
| 2010/0149217 A1 | 6/2010 | Mielke |
| 2010/0293281 A1 | 11/2010 | Tsimelzon |
| 2011/0093613 A1 | 4/2011 | Banes |
| 2011/0173251 A1 | 7/2011 | Sandhu |
| 2011/0185023 A1* | 7/2011 | Jin ........................ G06Q 10/06 709/206 |
| 2012/0019564 A1 | 1/2012 | Almgren |
| 2012/0166299 A1 | 6/2012 | Heinstein |
| 2012/0324365 A1 | 12/2012 | Momchilov |
| 2013/0086652 A1 | 4/2013 | Kavantzas |
| 2013/0174015 A1 | 7/2013 | Kwan |
| 2013/0212420 A1 | 8/2013 | Lawson |
| 2013/0305036 A1 | 11/2013 | Vos |
| 2014/0013375 A1 | 1/2014 | Giladi |
| 2014/0139700 A1 | 5/2014 | Sato |
| 2014/0153422 A1 | 6/2014 | Nambiar |
| 2014/0215120 A1* | 7/2014 | Saylor ................. G06F 12/0238 711/102 |
| 2014/0222930 A1 | 8/2014 | Gangadharan |
| 2014/0223011 A1 | 8/2014 | Smith |
| 2014/0223452 A1 | 8/2014 | Santhanam |
| 2014/0304421 A1 | 10/2014 | Karaoguz |
| 2015/0088978 A1 | 3/2015 | Motukuru |
| 2016/0036818 A1 | 2/2016 | Patesaria |
| 2016/0219089 A1 | 7/2016 | Murthy |
| 2016/0285976 A1 | 9/2016 | Chan |
| 2017/0134357 A1 | 5/2017 | Ohlsson |
| 2017/0171322 A1 | 6/2017 | Golding |

OTHER PUBLICATIONS

Canadian Examination Report, Application No. 2,969,713, dated Oct. 4, 2018, 4 pages.
IBM, *Session Management Support*, as available at https://www.ibm.com/support/knowledgecenter/SSAW57_8.5.5/com.ibm.websphere.nd.multiplatform.doc/ae/cprs_sesm.html , retrieved on Nov. 27, 2018, 4 pages.
International Preliminary Report on Patentability, Application No. PCT/US2016/054019, dated Apr. 12, 2018, 7 pages.
International Search Report and Written Opinion, Application No. PCT/US2016/054019, dated Dec. 8, 2016, 15 pages.
Application and File History for U.S. Appl. No. 15/277,896, filed Sep. 27, 2016, Inventors: Charles et al.
Universally Unique Identifier (UUID) (RFC 4122), as available on Feb. 2, 2019 at https://www.famkruithof.net/uuid/uuidgen, 1 page.
IBM Knowledge Center, http://www .01 . ibm. com/support/knowledgecenter/SSAW5 7_8. 5. 5/com.ibm.websphere.nd.doc/ae/cprs_sesm.html, dated Jul. 15, 2015, 1 page.
European Search Report , Application No. 12165061.8, completed Oct. 16, 2012, 2 pages.
European Search Report , Application No. 11195726.2, completed Jun. 5, 2012, 3 pages.
International Search Report, International Application No. PCT/US2015/063721, dated Feb. 9, 2016, 2 pages.
Written Opinion, International Application No. PCT/US2015/063721, dated Feb. 9, 2016, 8 pages.

* cited by examiner

SYSTEM AND METHOD FOR GENERATING GLOBALLY-UNIQUE IDENTIFIERS

RELATED APPLICATIONS

The present application is a National Phase entry of PCT Application No. PCT/US2015/063721, filed Dec. 3, 2015, which claims priority from U.S. Provisional Application No. 62/088,414, filed Dec. 5, 2014, each of which is hereby fully incorporated herein by reference.

BACKGROUND

There are many different methods for creating computer-based identifiers, for example, identifying products, devices, and other elements. The term Globally Unique Identifier or GUID is generally referred to as various implementations of a universally unique identifier (UUID) standard as defined by RFC 4122. GUIDs are the Microsoft implementation of the distributed computing environment (DCE) universally unique identifier (UUID). In such systems, RPC run-time libraries use UUIDs to check for compatibility between clients and servers and to select among multiple implementations of an interface. Windows access-control functions use GUIDs to identify the type of object that an object-specific ACE in an access-control list (ACL) protects.

SUMMARY

Currently, the industry standard uses GUID, however there are many challenges using GUID, as the system does not provide a unique ID at an enterprise or global level. According to various aspects of the present invention, systems and methods are provided for producing a new globally-unique identifier (GUID) format that may be used, for instance, to uniquely identify a number of different items in a distributed computer system, such as, for example, transactions in an e-commerce system, sessions in a cloud-based computing system, identifiers for unique customers in an ecommerce system, among others. The unique ID may have one of a number of different formats that may be generated upon receiving a request for an ID. For instance, the GUID may be generated in a plain hex format, a GUID format, ESS, and B64B (Base64Binary) format. The new format may be generated based on information relating to a site ID, an absolute time, and a sequential counter, that ensures that no two GUIDs are the same. Further, the system may be capable of issuing multiple GUIDs within a single command, such as may be required to generate an array of GUIDs.

According to one aspect of the present invention, a centralized global architecture is provided that permits service-based generation of GUIDs on demand from multiple applications (e.g., cloud-based user session identification, transactions, media identification, user/customer identification, security and application logging, item identification, etc.). According to various implementations, an architecture of such a GUID-generating system may use multiple sites for assigning GUIDs.

In one implementation, the systems may be implemented using an IBM mainframe system using z/OS. In another implementation, such systems may be implemented using virtual servers, and may be arranged in a failover configuration that ensures that GUIDs may be generated upon request. In another example, the distributed system that generates GUIDs may implement a centralized clock, and GUIDs may include time information generated by such a clock. In the case of an IBM-based environment, site IDs may be generated from an IBM Parallel Sysplex and clock and counter information may be used from a shared memory. In another implementation, a sequential counter may used to ensure uniqueness for GUIDs that are generated at the same device by different processing entities.

In yet another implementation, a command-based UID generation architecture may be provided that adaptively generates UIDs in a number of selectable formats controlled by a particular requester. For instance, a service may be provided that allows for UIDs to be generated for use by a host of different entity types and applications. For instance, a system may be provided that adaptively generates GUIDs relating to particular implementations of applications (e.g., cloud-based user session identification, ecommerce transactions, media identification, user/customer identification, security and application logging, other cloud-based applications, unique item identifiers generated across multiple store locations, etc.). Further, a centralized registry of GUIDs that are adaptively generated in real time may be beneficial, as such entities may request such GUIDs in real time, and therefore, multiple different entities may independently operate to request GUIDs that are unique amongst different entities (e.g., applications, different systems, etc.).

In yet another example implementation, a GUID-generating system may be provided that can generate multiple GUIDs from a single request (e.g., as provided in an output array format). For instance, there may be some types of entities that need multiple GUIDs, and a more efficient way of producing and transferring multiple GUIDs (e.g., as generated as a result of a single action or request) may be beneficial.

According to one aspect of the present invention, a system is provided for generating a plurality of globally-unique identifiers (GUIDs), the system comprising a memory, an interface adapted to receive one or more requests for at least one GUID from at least one plurality of executing applications, and a processing component that adaptively generates the requested at least one GUID, wherein the interface is adapted to communicate the at least one GUID to the at least one of the plurality of executing applications. In one embodiment of the present invention, the system further comprises at least one other processing component adapted to generate at least one other GUID among the plurality of GUIDs, wherein each one of the plurality of GUIDs generated by the processing component and at least one other processing component is unique.

In another embodiment, the system includes at least one other processing component that adaptively generates the requested at least one GUID, and wherein the one or more requests for at least one GUID may be alternatively processed by the processing component and the at least one other processing component. In another embodiment, the processing component that adaptively generates the requested at least one GUID is adapted to generate a GUID responsive to a determined site identifier and an indication of time.

In yet another embodiment, the processing component that adaptively generates the requested at least one GUID is adapted to generate a GUID responsive to counter information. In another embodiment, the site identifier, indication of time and counter information are shared among the processing component and the at least one other processing component. In another embodiment, the counter is located in a shared memory associated with the processing component and the at least one other processing component.

In another embodiment, the processing component and the at least one other processing component share an indication of time. In another embodiment, the indication of time includes a shared system clock that is shared by the processing component and the at least one other processing component. In another embodiment, the counter determines is incremented upon the generation of at least two GUIDs having a same indication of time value.

According to another aspect of the present invention, a system is provided for generating a plurality of globally-unique identifiers (GUIDs). The system comprises a memory, an interface adapted to receive at least one request for at least one GUID from at least one plurality of requesting entities, wherein the at least one request comprises a command specifying an output format of the at least one GUID, and a processing component that adaptively generates the requested at least one GUID in the specified output format, wherein the interface is adapted to communicate the at least one GUID to the at least one of the requesting entities. In one embodiment, the command indicates at least one of a plurality of selectable formats specified by the at least one requesting entity.

In another embodiment, the processing component that adaptively generates the requested at least one GUID is responsive to information within the command indicating at least one of a plurality of selectable formats specified by the at least one requesting entity. In another embodiment, the plurality of selectable formats includes at least one of a group comprising a plain hexadecimal format, a conventional GUID format, an ESS format, and a B64B format. In another embodiment, the command specifies whether the generated at least one GUID is journaled to a central database of GUIDs. In another embodiment, the command format permits an entity to save custom information to the central database of GUIDs.

In another embodiment, the processing component is adapted to store information regarding the generation of the request to the central database of GUIDs. In another embodiment, the processing component is adapted to store information regarding an originator of the request to the central database of GUIDs. In another embodiment, the processing component that adaptively generates the requested at least one GUID, based on at least one or more of the group of information including a site identifier, a time indication, and a counter. According to another aspect of the present invention, a system is provided for generating a plurality of globally-unique identifiers (GUIDs), the system comprising a memory, an interface adapted to receive at least one request for multiple GUIDs from at least one plurality of requesting entities, wherein the at least one request includes an indication of a request for generating the multiple GUIDs, and a processing component that adaptively generates the requested multiple GUIDs, wherein the interface is adapted to communicate the multiple GUIDs to the at least one of the requesting entities. In one embodiment, the processing component is adapted to generate the requested multiple GUIDs within a single processing action.

In another embodiment, the processing component is adapted to generate the requested multiple GUIDs within a single clock cycle. In another embodiment, the processing component is adapted to generate a data structure including the multiple GUIDs. In another embodiment, the processing component is adapted to generate the requested multiple GUIDs responsive to a single request to generate the multiple GUIDs.

In another embodiment, the processing component that adaptively generates the requested multiple GUIDs is adapted to generate an output array including the multiple GUIDs. In another embodiment, the processing component is adapted to communicate the output array to the at least one of the requesting entities using an HTTP header. In another embodiment, the processing component adaptively generates the requested multiple GUIDs, based on at least one or more of the group of information including a site identifier, a time indication, and a counter. In another embodiment, the processing component that adaptively generates the requested multiple GUIDs generates the multiple GUIDs within a single operation responsive to incrementing the counter.

According to another aspect of the present invention, a system is provided for generating a plurality of globally-unique identifiers (GUIDs). The system comprises a memory, an interface adapted to receive at least one request for at least one GUID from at least one plurality of requesting entities, a processing component that adaptively generates the requested at least one GUID, wherein the interface is adapted to communicate the at least one GUID to the at least one of the requesting entities, and a registry component that documents the creation of the requested at least one GUID. In one embodiment, the at least one request comprises a command specifying a request to generate the at least one GUID.

In another embodiment, the command includes an indication that controls a performance of the registry component. In another embodiment, the command includes data specified by the at least one requesting entity that is written to a registry by the registry component.

According to another aspect of the present invention, a computer system is provided for generating a plurality of globally-unique identifiers (GUIDs). The computer system comprises a memory, an interface adapted to receive at least one request for at least one GUID from at least one plurality of requesting entities, and a processing component that adaptively generates the requested at least one GUID, based on at least one or more of the group of information including a site identifier, a time indication, and a counter. In one embodiment, the site identifier is determined based on an identifier of the computer system for generating the plurality of globally-unique identifiers (GUIDs).

In another embodiment, the counter is decremented responsive to the generation of at least two GUIDs having the same time indication. In another embodiment, the system includes a system clock function that produces a system clock value, and the processing component is adapted to generate the at least one GUID using the system clock function. In another embodiment, the system includes at least one other processing component that adaptively generates GUIDs using the same system clock value.

According to another aspect of the present invention, a method is provided comprising receiving one or more requests for at least one of a plurality of globally-unique identifiers (GUIDs) from at least one plurality of executing applications, and adaptively generating, by a processor, the requested at least one GUID, wherein the interface is adapted to communicate the at least one GUID to the at least one of the plurality of executing applications. According to one embodiment, the method further comprises an act of generating, by another processor, at least one other GUID among the plurality of GUIDs, wherein each one of the plurality of GUIDs generated by the processor and the another processor is unique.

In another embodiment, the one or more requests for at least one GUID may be alternatively processed by the processor and the another processor. In another embodiment, the method further comprises an act of generating the requested at least one GUID responsive to a determined site identifier and an indication of time. In another embodiment, the method further comprises an act of generating the requested at least one GUID responsive to counter information.

In another embodiment, the site identifier, indication of time and counter information are shared among the processor and the another processor. In another embodiment, the counter is located in a shared memory associated with the processor and the another processor. In another embodiment, the processor and the another processor share an indication of time. In another embodiment, the indication of time includes a shared system clock that is shared by the processor and the another processor. In another embodiment, the method further comprises an act of changing a value of the counter responsive to a generation of at least two GUIDs having a same indication of time value.

According to another aspect of the present invention, a method is provided comprising acts of receiving at least one request for at least one GUID from at least one plurality of requesting entities, wherein the at least one request comprises a command specifying an output format of the at least one GUID, and adaptively generating, by a processor, the requested at least one GUID responsive to the specified output format of the at least one request, wherein the interface is adapted to communicate the at least one GUID in the specified output format to the at least one of the requesting entities. In another embodiment, the command indicates at least one of a plurality of selectable formats specified by the at least one requesting entity.

In another embodiment, the processor is responsive to information within the command indicating at least one of a plurality of selectable formats specified by the at least one requesting entity. In another embodiment, the plurality of selectable formats includes at least one of a group comprising a plain hexadecimal format, a conventional GUID format, an ESS format, and a B64B format.

According to another aspect of the present invention, a method is provided comprising receiving, through a communication network, at least one request for multiple ones of a plurality of globally-unique identifiers (GUIDs) from at least one plurality of requesting entities, wherein the at least one request includes an indication of a request for generating the multiple GUIDs, and adaptively generating, by a processor, the requested multiple GUIDs, wherein the interface is adapted to communicate the multiple GUIDs to the at least one of the requesting entities via the communication network. In another embodiment, the method further comprises an act of generating by the processor, in a single processing action, the requested multiple GUIDs. In another embodiment, the method further comprises an act of generating by the processor, in a single clock cycle, the requested multiple GUIDs.

In another embodiment, the method further comprises an act of generating by the processor, a data structure including the multiple GUIDs. In another embodiment, the method further comprises an act of generating, by the processor, the requested multiple GUIDs responsive to receiving a single request to generate the multiple GUIDs.

According to another aspect of the present invention, a method is provided comprising receiving, via a communication interface, at least one request for at least one of a plurality of globally-unique identifiers (GUIDs) from at least one plurality of requesting entities, adaptively generating, by a processor, the requested at least one GUID, communicating, by the communication interface, the at least one GUID to the at least one of the requesting entities; and documenting, in a registry, the generation of the requested at least one GUID. In another embodiment, the at least one request comprises a command specifying a request to generate the at least one GUID. In another embodiment, the command includes an indication that controls a performance of the registry. In another embodiment, the command includes data specified by the at least one requesting entity, and wherein the method further comprises writing the data specified by the at least one requesting entity to the registry.

According to another aspect of the present invention, a method is provided comprising receiving, via a communication interface, at least one request for at least one of a plurality of globally-unique identifiers (GUIDs) from at least one plurality of requesting entities, adaptively generating, by a processor, the requested at least one GUID, wherein the processor adaptively generates the requested at least one GUID based on at least one or more of the group of information including a site identifier, a time indication, and a counter, and communicating, by the communication interface, the at least one GUID to the at least one of the requesting entities. According to one embodiment, the site identifier is determined based on an identifier of a computer system including the processor that adaptively generates the requested at least one GUID.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

Figure 1:
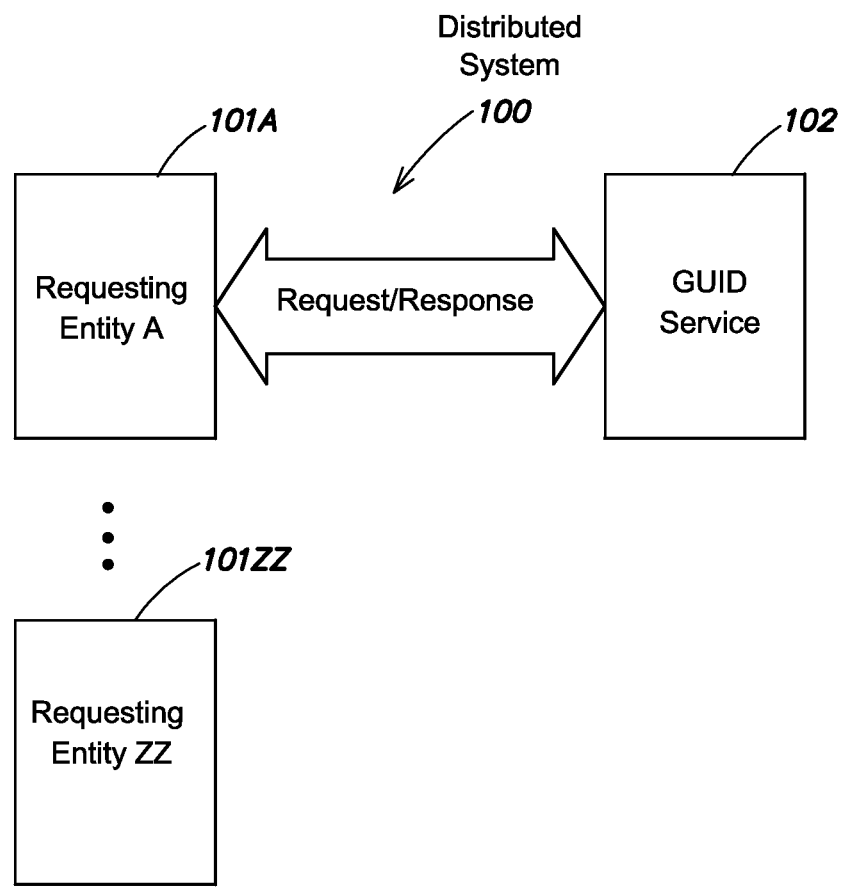
FIG. 1 is a block diagram showing a system for producing GUID information according to various aspects of the present invention.

FIG. 1 shows a block diagram of a distributed system 100 suitable for implementing various aspects of the present invention. In particular, according to one embodiment, FIG. 1 shows a system 100 that includes a GUID service 102 that is capable of storing and servicing requests for GUID information according to various embodiments of the present invention. More particularly, a GUID service 102 may be provided that services one more requests received from one more requesting entities (e.g., requesting entities 101A-101ZZ). The requesting entities may be any computing entity, such as for example, an application, a system, the process, or any other entity capable of formatting and sending a request for a GUID to GUID service 102. GUID service 102 is configured to process such requests and provide corresponding responses to entities within the distributed system 100. Such requests and responses may be communicated using one or more protocols over one or more communication networks.

According to various aspects of the present invention as described more fully below, such a service may be used to uniquely identify information among a number of various systems. According to one aspect of the present invention, is appreciated that conventional GUID generating systems are not capable of fulfilling requests for multiple entity types and applications, and cannot ensure that such GUIDs are globally unique among systems.

Figure 2A:
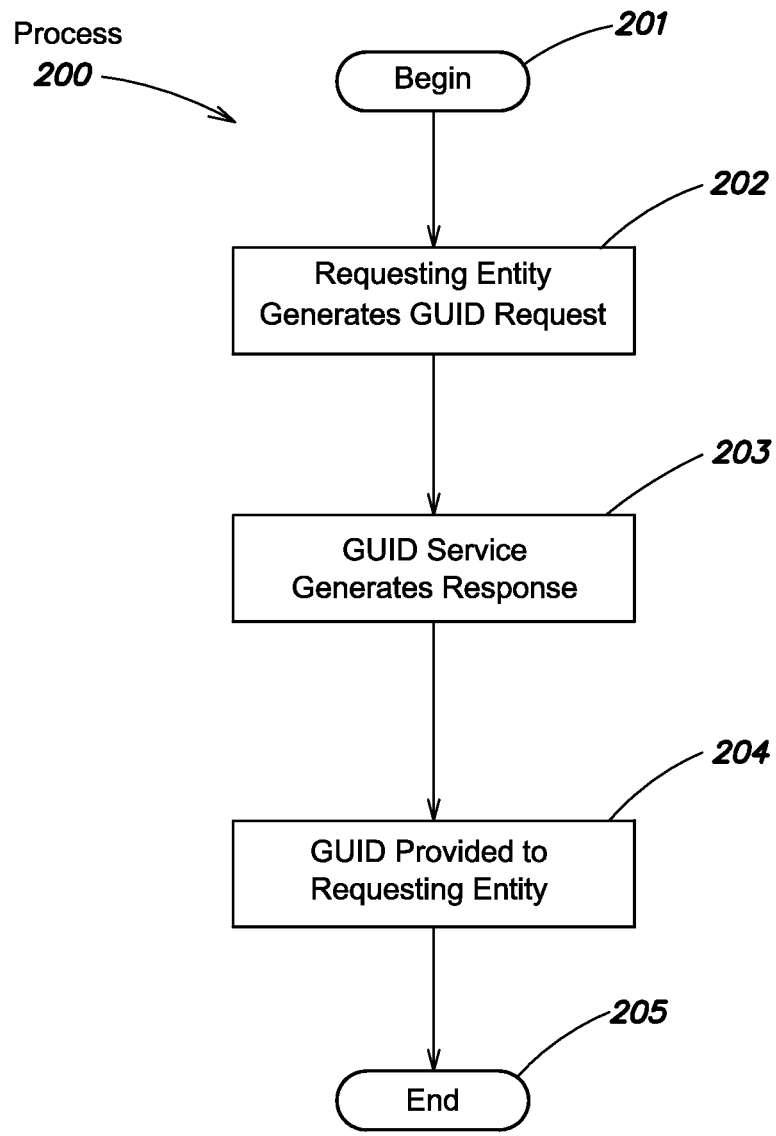
FIGS. 2A-2C show flowcharts showing processes for generating GUID information according to various aspects of the present invention.

FIG. 2A shows an example process 200 for generating GUID information according to various aspects of the present invention. At block 201, process 200 begins. At block 202, a requesting entity generates a GUID request. For instance, the GUID request may be one of a number of various formats (e.g., formatted as a web service request) and may include one or more parameters that specify how the GUID should be generated. At block 203, a GUID service may examine the request and generate an associated response. At block 204, the GUID may be provided to the requesting entity. For instance, GUID service (e.g., GUID service 102) may provide GUID information within a response message communicated to the requesting entity over one or more communication networks. At block 205, process 200 ends.

Figure 2B:
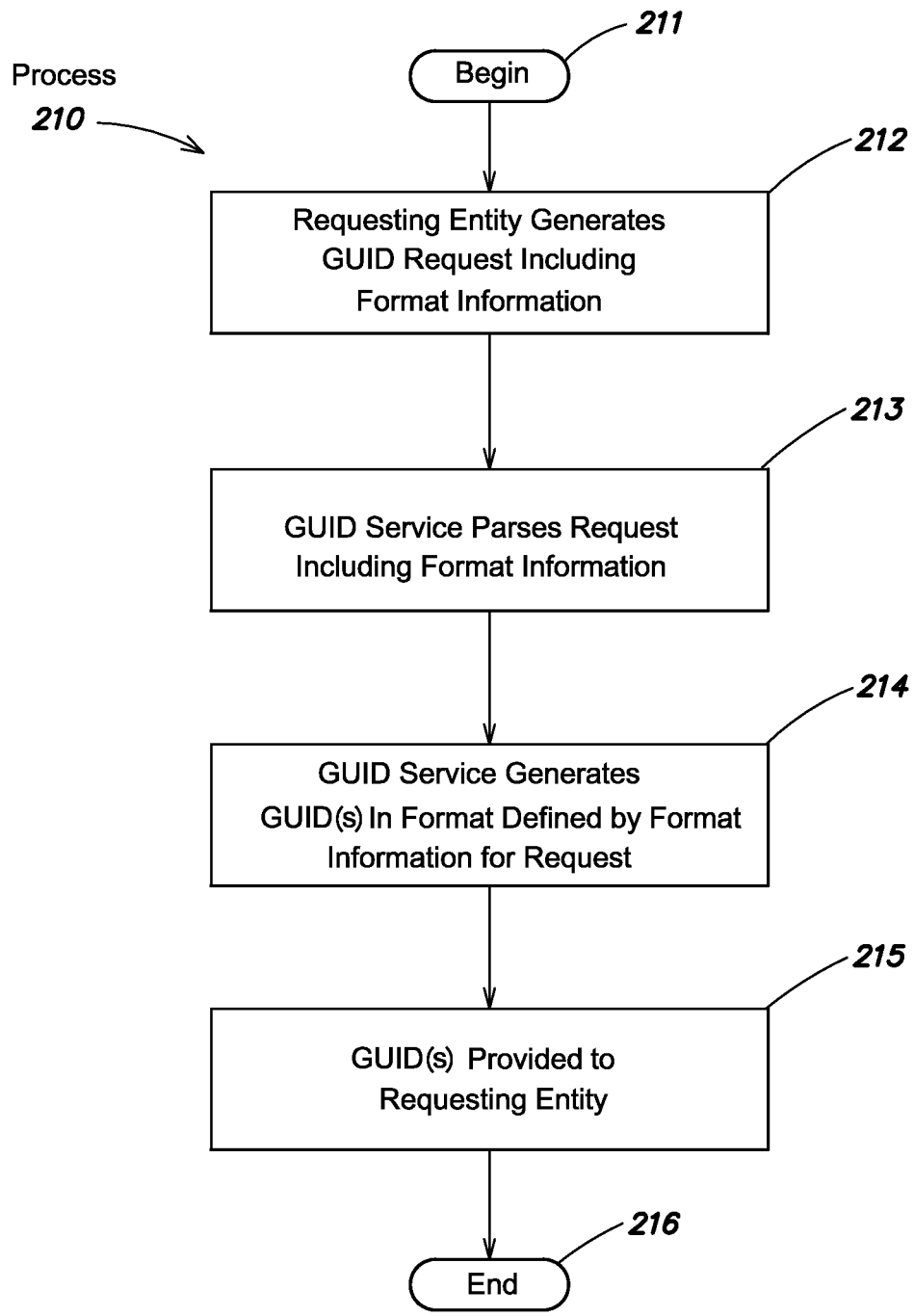

FIG. 2B shows another example process 210 for generating GUID information according to various embodiments of the present invention. At block 211, process 210 begins. At block 212, a requesting entity generates a GUID request including format information. According to one embodiment, the format information specifies what type of format of the GUID is being requested by the requesting entity. As discussed above, one aspect of the present invention relates to a service that provides on-demand GUID information to one or more requesting entities of various types. Depending on the needs of the application, it may be beneficial to provide a service that generate globally unique identifiers in one of a number of varying formats including, but not limited to, a conventional GUID format, and ESS format, a Base64Binary (B64B) format, among other formats. Therefore, the service for assigning GUIDs may be provided centrally and maybe capable of servicing many different entity types.

At block 213, the GUID service parses the request including the format information. At block 214, the GUID service generates one or more GUIDs in a format defined by the format information included within the request. At block 215, the GUIDs are provided to the requesting entity within one or more response messages communicated to the requesting entity. At block 216, process 210 ends.

Figure 2C:
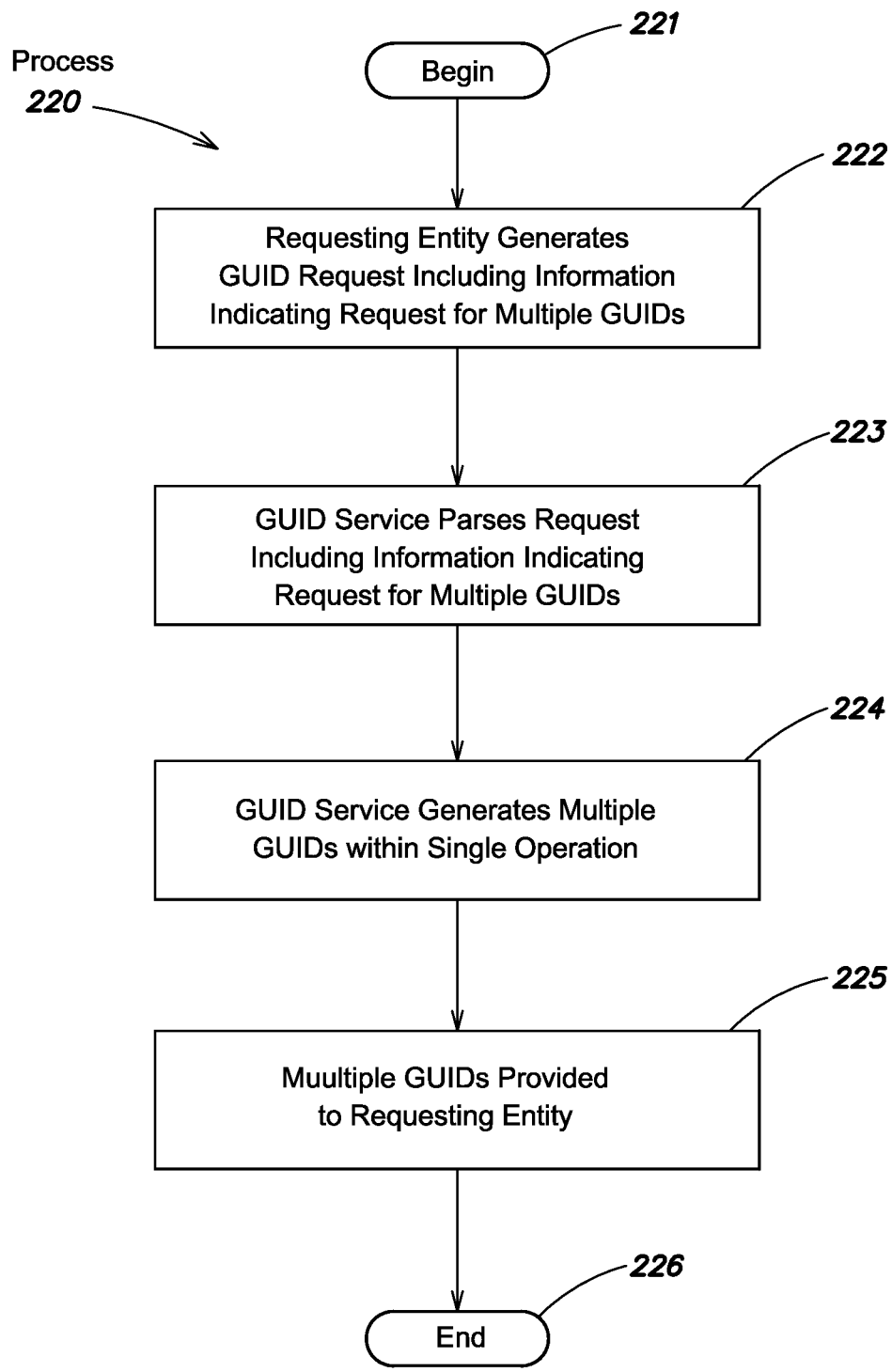

FIG. 2C shows another example process 220 for generating GUID information according to various embodiments of the present invention. At block 221, process 220 begins. At block 222 a requesting entity generates a GUID request including information indicating that the request is for multiple GUIDs. According to one aspect of the present invention discussed above, the GUID service capable of generating multiple GUIDs responsive to a single request. For example, there may be instances where an application needs multiple requests and a serial generation of GUIDs is not efficient. According to one aspect, the GUID service is capable of generating multiple GUIDs within a single operation, such that individual requests for individual GUIDs is not required. Further, it is appreciated that the requesting system may operate more efficiently as multiple GUIDs may be generated as part of a single request. Also, the GUID service may be configured to generate multiple GUIDs within a single clock cycle or other operation, such that the generation of GUID information is more efficient.

At block 223, the GUID service parses the request including information indicating the request for multiple GUIDs. At block 224, the GUID service generates multiple GUIDs within a single operation. The generated multiple GUIDs may be provided to the requesting entity at block 225. For instance, multiple GUIDs may be provided within an array some other data structure type that can be communicated to the requesting entity. In one embodiment, an array may be passed to a requesting entity using HTTP. At block 226, process 220 ends.

Figure 3:
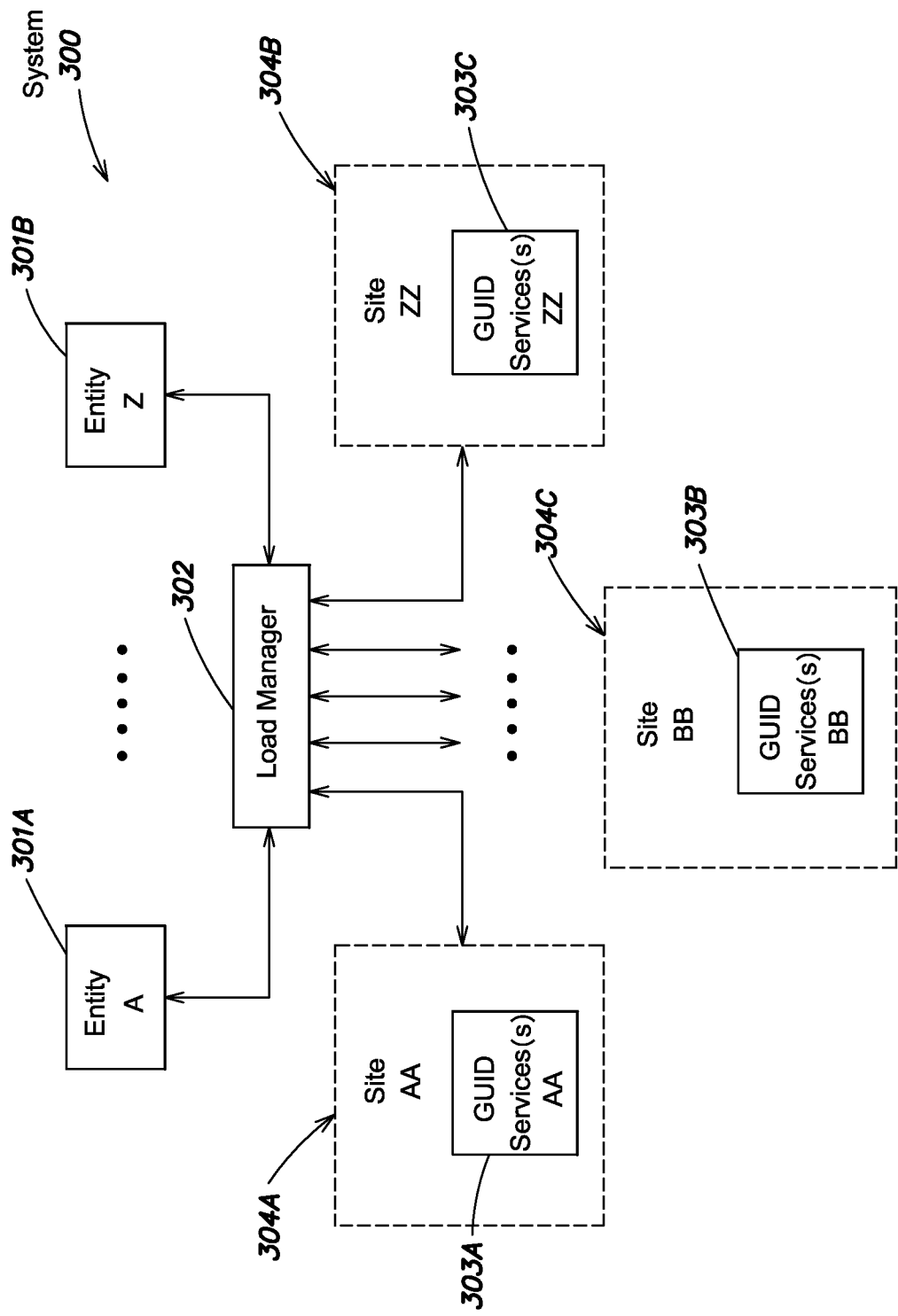
FIG. 3 is a block diagram showing a distributed system for providing GUID information to one or more entities according to various embodiments of the present invention.

FIG. 3 shows an example configuration of a distributed system 300 that services GUID requests according to one embodiment of the present invention. It is appreciated that a GUID service may be operated among multiple computing sites in a distributed computer system 300 according to one embodiment of the present invention. For instance, requests received by entities (e.g., entity A 301A, entity Z 301B, etc.) may be directed to different sites (e.g., site AA 304A, site BB 304C, site ZZ 304B). In one implementation, such sites may be geographically located (e.g., a North American site, an Asia-Pacific site, sites located in different countries, etc.) and such sites may receive and respond to requests generated by entities geolocated within those areas.

Although it is appreciated that some entities may have dedicated sites to which they send requests, it should be appreciated that some requests may be load-shared between multiple sites via a load manager (e.g., load manager 302). Load manager 302 may be a router, a computer system or other type of specialized system capable of receiving requests and directing the requests to different sites. Each site may include one or more computing entities (e.g., nodes, processes, systems, mainframes, virtual servers, etc. or combinations thereof) capable of servicing such requests. Therefore, there may be one or more instances of the services that reside in such sites, such as for example, GUID service AA 303A, GUID service BB 303B, and GUID service ZZ 303C. It is appreciated that such services may be supported by one or more physical systems, such as one or more server systems, a collection of systems (e.g., bladed server systems), a cluster of systems, mainframe computer system, or any type and configuration of systems. Such systems may also include virtualized resources such as virtual server systems, and may include one or more levels of virtualization. In one embodiment, such a GUID service may be implemented across sites to provide redundancy in the case of site or system failure.

Figure 4:
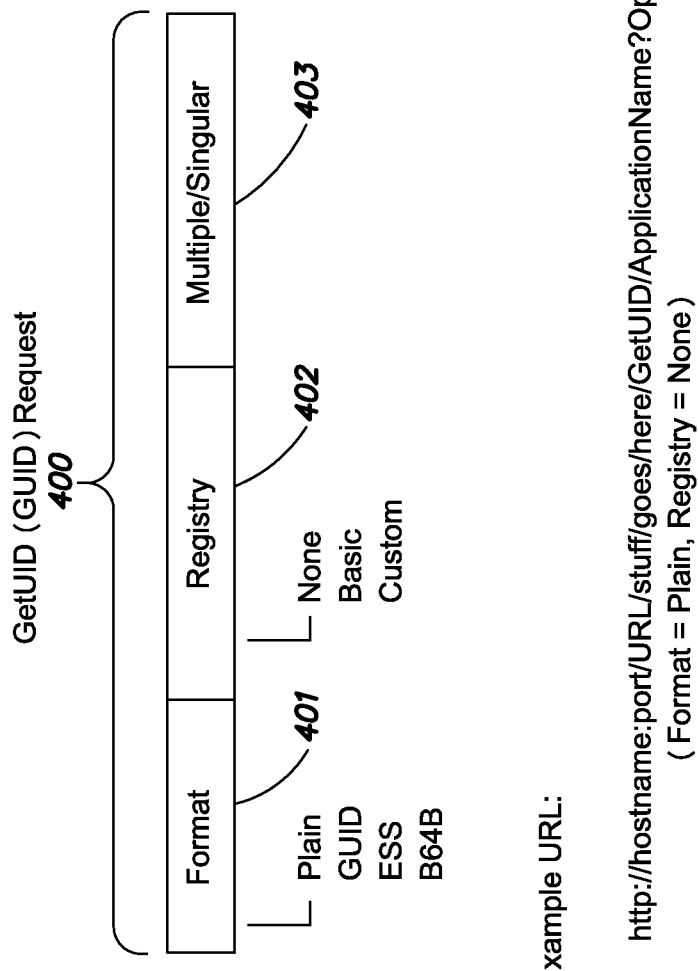
FIG. 4 shows an example GUID request format according to various embodiments of the present invention.

FIG. 4 shows one example format 400 of a GetUID (GUID) request according to one embodiment of the present invention. As discussed above, the requesting entity may generate and communicate a request to a GUID service. As discussed, the GUID request may include one or more parameters that control how GUID information is generated.

For instance, a GUID request 400 may include format information 401 that identifies an output format of GUID information being generated. For instance, a request may specify that the GUID should be generated in a plain format, a GUID format (e.g., a conventional GUID format type), an ESS format, B64B, or other type of format. The format of the conventional GUID has been adopted in the open systems world as a 32 byte character representation of a 16 byte hexadecimal value in the following format: xxxxxxxx-xxxx-xxxx-xxxx-xxxxxxxxxxxx, such as 2e7d0f3f-00cd-74ca-359e-31c50000375a. In one implementation, the service may provide the option to provide output GUID information in one of the following formats:

PLAIN—2e7d0f3f00cd74ca2a17dabe00003759
GUID—2e7d0f3f-00cd-74ca-359e-31c50000375a
ESS—2e7d0f3f-00cd74ca3d56a79f-0000375b
B64B—a 24 byte Base64Binary encoded ID that when decoded is the actual 16 byte hex Unique ID According to one embodiment of the present invention, such request parameters may be provided as part of options within a query string sent to the GUID service. Other options may be provided, such as a registry option.

For instance, it may be appreciated that GUID information may be generated as needed by UID generation services. Such information does not necessarily have to be tracked by the GUID generator. In such cases, a GUID may simply be generated and no long term storage of the generated GUID is required. However, in some instances, it may be necessary to store and register such GUID information within a central location. For instance, such as service may register other information associated with the request, such as requester information, the continent which the request was issued, or other information that may be desired to be recorded to a database according to various aspects of the present invention. In this way, multiple entities having various requirements may be permitted to include a facility that allows for tracking of GUIDs that are generated along with any other information that might be needed for the particular entity.

The registry option may be provided as part of the request (e.g., as a registry option information 402 within the GUID request 400). As discusses, the registry option enables the requesting entity (e.g., a client or other requestor type) the ability to register the unique ID, which is recorded in a database. The database itself may also be a centralized and shared database that is accessible by one or more GUID generators.

According to one implementation, a key for the registry table is the GUID and the information stored for this entry is basic information and any requested custom information. The GUID registry may be provided in the form of a dedicated table accessible through web service requests (e.g., accessible using the REST service requests or other web service request types). Authorized clients can simply issue a call to the database specifying the GUID as the key and the basic or custom information is returned to the requestor. As discussed, options may include:

REGISTRY=NONE—The service will not write the GUID to the registry (this may be the default option)
REGISTRY=BASIC—The GUID is written to a registry with basic information, such as Business unit, sub unit, application, UserID, date and time the request was issued.
REGISTRY=CUSTOM—The requesting entity can provide 1-1024 bytes of custom information that will be written to the registry, along with the basic information as a standard header.

According to another aspect of the present invention, a requesting entity may identify that more than one GUID is being requested. For instance, the GUID request 400 may include information 403 that identifies whether multiple GUIDs are being requested. In one implementation, the request for multiple IDs may be specified within an HTTP header, but it should be appreciated that the request can be formatted within any portion of request. According to one embodiment, the GUID information may be provided as part of a GUID-array having array locations from 0001-1000. This feature enables the GUID service to return from 1 to 1000 UIDs on a single request. In one implementation, the results are provided within a response (e.g., an HTTP response) that is pipe delimited. Because of this implementation, it is possible to provide multiple UIDs on a single request and still guarantee that the GUID information is unique and will not be duplicated, regardless of transaction volume or site origination. In another implementation, when the HTTP header is not present, the array default is 1.

Below is an example of the URL for a provisioned GUID service showing options that may be used:

http://hostname:port/URL/stuff/goes/here/GetUID/ApplicationName?OPTIONS(FORMAT=PLAIN, REGISTRY=NONE)
http://hostname:port/URL/stuff/goes/here/GetUID/ApplicationName?OPTIONS(FORMAT=GUID, REGISTRY=BASIC)
http://hostname:port/URL/stuff/goes/here/GetUID/ApplicationName?OPTIONS(FORMAT=ESS,REGISTRY=CUSTOM)

Figure 5:
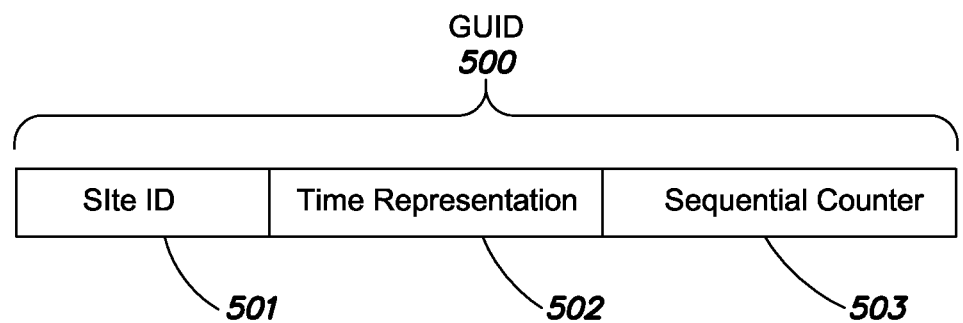
FIG. 5 shows an example GUID format according to one embodiment of the present invention.

FIG. 5 shows an example format of a GUID 500 one embodiment of the present invention. For example, there may be one or more components of the GUID information. For instance, GUID format may include site ID information 501, time representation information 502 and sequential counter information 503. Such information may be generated by the GUID service. For instance, site ID information 501 may include information that identifies unique site (e.g., within a distributed communication network that includes GUID services). Time representation information 502 may include information identify when the GUID was generated. Sequential counter information 503 may be a counter or other arbitration mechanism that permits unique identification of GUIDs that are requested or generated at the same time.

Site ID

In one embodiment, the site ID is a 4 byte unique name that represents a particular system that services GUID requests (e.g., an IBM mainframe system such as a z/OS Parallel Sysplex). This site ID is chosen to be unique and is not duplicated across sites within the distributed network. According to one embodiment, the site ID is static, which means the site ID information has a speed of zero (i.e., the information does not ever change within a site). In another implementation, the site ID may be presented in a 'cryptic' or non-human readable manner, so that the site ID information is not recognizable by sight. In one implementation, the first four bytes of the GUID is a site ID. Because the site ID may be used to form part of the GUID, GUIDs generated from different sites are guaranteed to be unique, and no coordination between sites for generating GUIDs is necessary.

Absolute Time (UTC)

According to one embodiment of the present invention, absolute time information may be used to generate GUID information. According to one implementation, absolute time is an 8 byte clock between microseconds and picoseconds that have elapsed since Jan. 1, 1900 at 00:00. This value will roll over to zeroes somewhere in the year 34,000.

According to one implementation, GUID can use absolute time as provided by an IBM z/OS Parallel Sysplex, which can consist of one or more hardware boxes (CEC/CPC), each sharing the same time using STP or 'system timer protocol' (a shared clock across all hardware in the IBM z/OS Parallel Sysplex). When using the assembler STCKE instruction on a z/OS Parallel Sysplex, the time value returned is guaranteed to be synchronized across all hardware within the Sysplex. This means that regardless of how many operating systems (e.g., LPARs) and how many virtualized servers (e.g., CICS servers) every execution of the GUID service is guaranteed to get the exact same clock time. Therefore, it is appreciated that if it is implemented within a computing environment that guarantees that clock time is shared among a number of executing entities, multiple computing entities may be used to sign GUID information responsive to service requests.

In an IBM environment, the STCKE (Store Clock Extended) instruction returns a 16 byte value, with the first byte providing carry out beyond the STCK limit (which rolls to zeros Sep. 17, 2042). The first 9 bytes (of the 16 byte value) provides the number of picoseconds that have elapsed since Jan. 1, 1900 at 00:00. In one implementation, an algorithm may use the first 8 bytes, which provides a resolution between microseconds and picoseconds, with the first byte (8 bits) extending the time beyond the year 34,000.

For example, a STCKE value of x'00CD9F77 AE9B4FFD 2400000000 01610002' represents a UTC (Universal Coordinated Time) of 13:17:42.224059 2014 Aug. 18 (with time being truncated after microseconds in this example). The absolute time continually moves forward at the same speed and is available with 100% accuracy across all CEC/CPC (Central Electronic Complex/Central Processing Complex), all OS images (LPARs) and all servers (CICS servers).

Sequential Counter

According to one implementation, a sequential counter may be used that ensures uniqueness for multiple requests that are serviced at the same exact time. For instance, it may be envisioned that multiple requests may be received from different entities for GUID information. A centralized and shared sequential counter may be used to arbitrate between simultaneous GUID requests. Although a sequential counter may be used, it should be appreciated that other methods may be used to arbitrate between GUID requests.

In one implementation within an IBM mainframe environment, the sequential counter is a 4 byte binary field that resides in shared memory within the z/OS Parallel Sysplex called the Coupling Facility (CF). This counter is available to all hardware (CEC/CPCZ), OS images (LPARs) and servers (CICS servers) thru a synchronous and serialized call to retrieve and increment the counter. The sequential counter can only be accessed in memory by one task at a time, ensuring the counter is sequential and not duplicated. The sequential counter is used to make absolute time unique should two or more service requests get the exact absolute time. The sequential counter ranges from 1-4,294,967,295 then will roll back to 1 and the counter repeats the process for each request. The sequential counter provides the ability to generate 4.2 billion unique IDs per sub-microsecond in time.

If there is the need to provide higher resolution of sequential counters per point in time, a simple code change to extend the sequential counter by 4 bits and reduce absolute time by 4 bits, would provide 68,719,476,735 unique IDs per microsecond in time. Depending on the rate of simultaneous requests, the sequential counter moves at a rate of demand of these simultaneous requests. Therefore, it should be appreciated that by providing the ability to handle multiple simultaneous requests for multiple GUIDs from multiple different entities by multiple different instances of a GUID generator, a system may be provided that can service a large number of applications, systems, and other entities.

Figure 6:
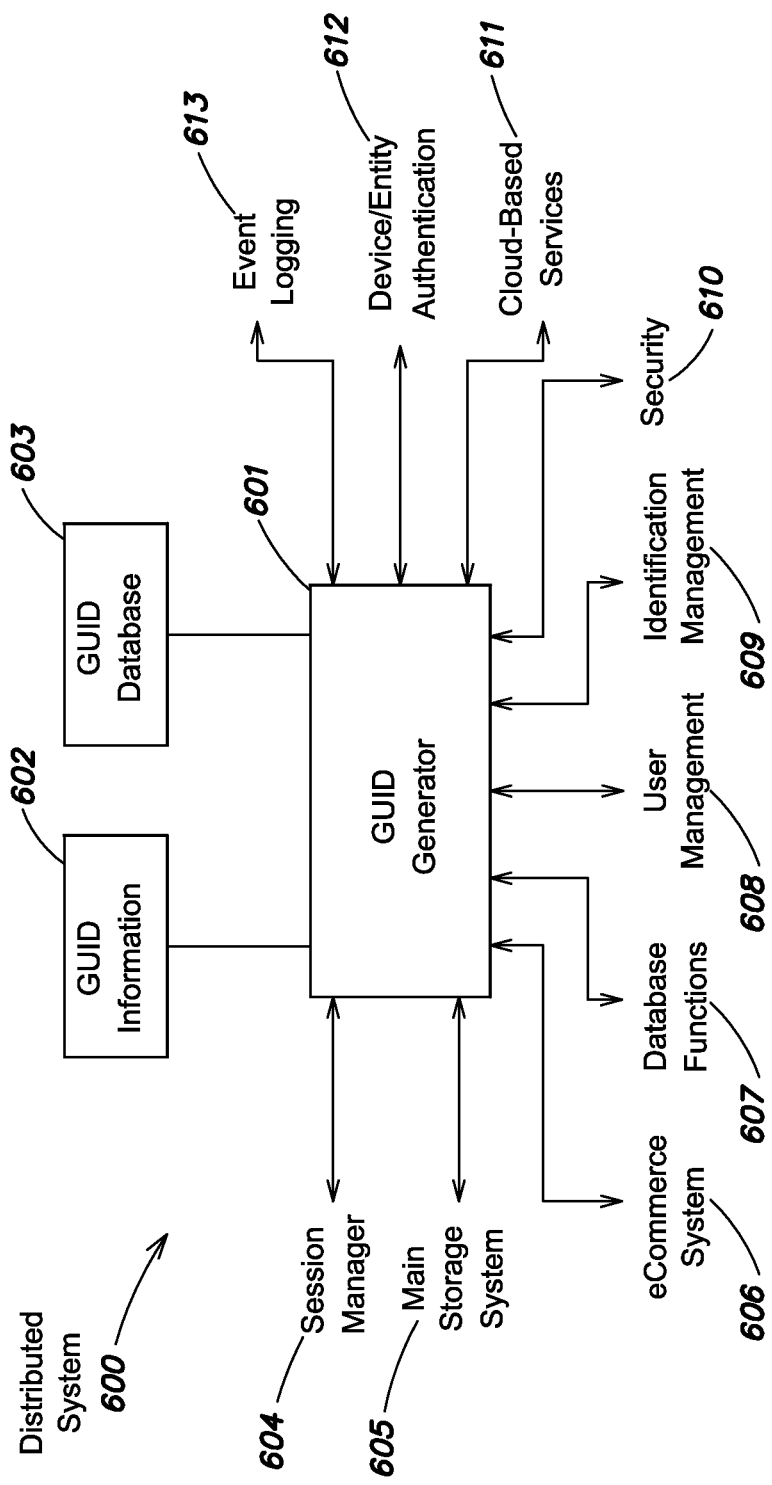
FIG. 6 shows an example distributed system in which multiple entity types are permitted to access the common GUID generator in accordance with various aspects of the present invention.

FIG. 6 shows an example distributed system 600 in which multiple entity types are permitted to access the common GUID generator in accordance with various aspects of the present invention. As discussed above, a GUID generator 601 may be provided that services one or more entities by providing GUID information 602, and optionally, maintains a GUID database 603. For instance, there are many practical applications where the unique identifier may be used, and it should be appreciated that if such identifiers can be globally unique, the functionality of such systems is enhanced. Some of the example systems that may use such GUID information includes, but is not limited to, a session manager 604 that maintains active communication sessions between entities, media storage system 605 that uniquely identifies particular media elements, and e-commerce system 606 that uniquely identifies transactions and/or users.

Further, other systems that may use GUID information includes one or more database functions 607 such as keys, indexes or other information that may allow the database system to perform optimally. A user management system 608 may use GUIDs to uniquely identify users globally without the possibility of duplication. An identification management system 609 may use GUID information to uniquely identify items (e.g., products, inventory, etc.) without duplication.

In the case of security system 610, GUID information may be used to uniquely identify users, passwords, security keys, or generate any other information relating to security and access. Further, it should be appreciated that any other entity may use GUID information such as cloud-based services 611, any apps, mobile devices, systems or other entity types. GUID information may also be used for device/entity authentication 612 or identification of such devices/entities. Also, an event logging system 613 may use GUID information to uniquely identify log entries from a number of disparate systems. Some example implementations are discussed in more detail below.

Session Manager

As discussed, a session manager may use GUID information generated is accordance with various aspects of the resent invention. For example, when logging into an application, there needs to be a way to store the user's configuration information in a cloud session management system. To ensure that each session is guaranteed to be unique, a GUID generator may be accessed to generate a unique endpoint id to store the user's session information. This allows the opportunity for applications to centrally store user information in the cloud and guarantee that no sessions will clash.

Media and Object Storage

For media management applications, users may need to upload a variety of media files (pictures, videos, songs, etc.) for a central media management system. However, since there exists the potential for multiple files to have the same media name, there needs to be a way to uniquely identify each media file without potential for overlap. By accessing a GUID service, the media system is guaranteed to have a unique identifier for each media file and allow enough for continued growth. Further, it should be appreciated that aspects of present relate to other storage application where unique IDs are desired.

Customer ID

When using large amounts of data (e.g., big data), it becomes a challenge to determine the best way to define a unique customer when the customers shop in many different domains. Using a serial number can become challenging because if the process is not setup correctly, there is the potential of overlap with other systems. By using a GUID generator according to various aspects of the present invention, a unique id can be created for each customer that is guaranteed not to overlap with any system that integrates into the overall definition of a customer.

Logging ID

With many applications logging their activities, it becomes important that there is a way to store each log message with a unique identifier to make sure there is not a potential for mixed messages from different applications. By using a GUID generator according to various aspects of the present invention, a unique identifier can be created for a log record that is guaranteed to be unique for that application even when all application logs are stored in a cloud-based system.

It should be appreciated that there are multiple applications where such a GUID generation service may be used, including, but not limited to creation of unique keys for cloud services and/or file storage access, creation of tokens and indexes for database applications, use of GUIDs as rollback identifiers for archiving application, among others.

Figure 7:
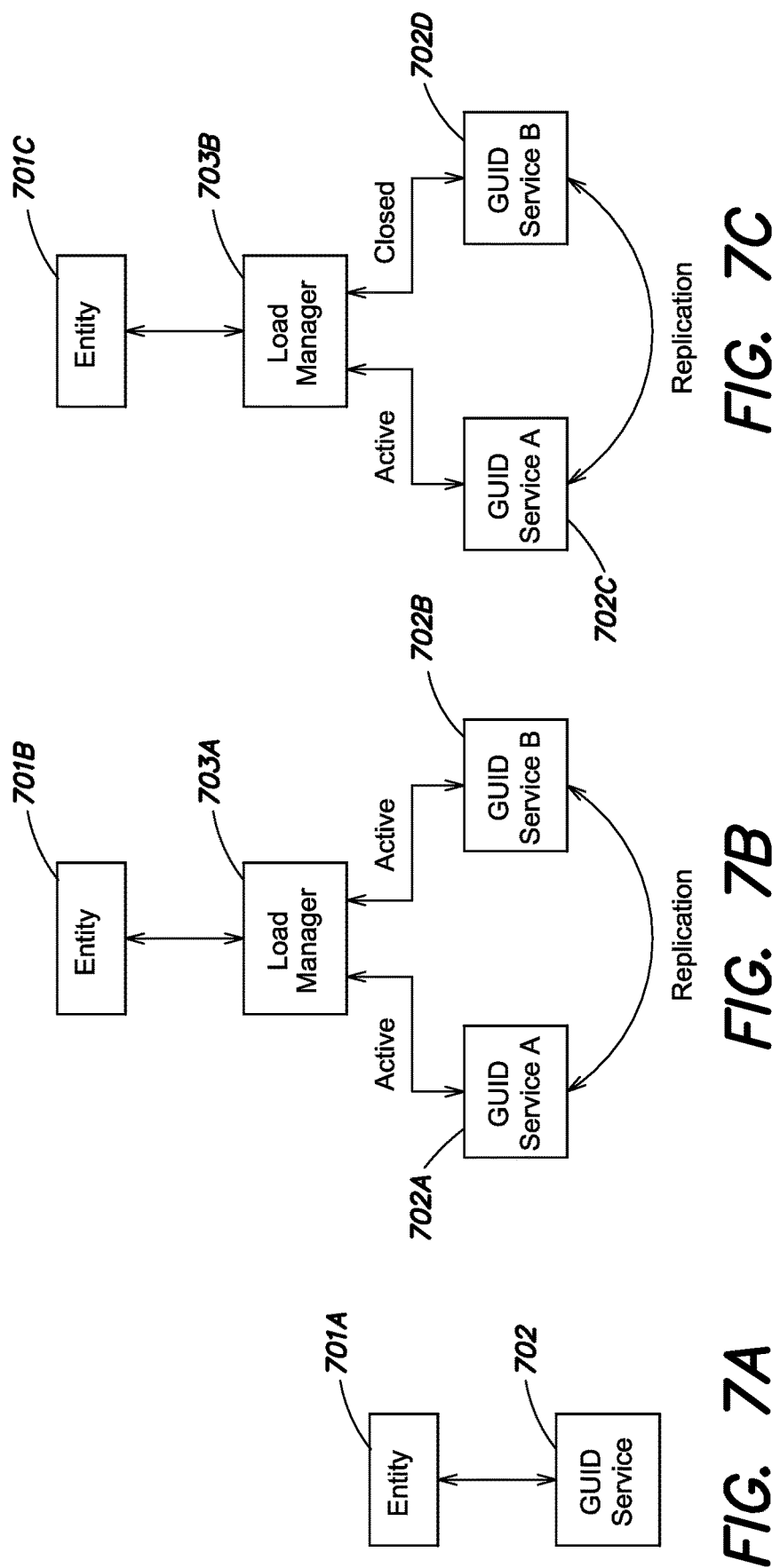
FIGS. 7A-7C show various configurations by which a GUID generator service may be supported in various failover scenarios in accordance with various aspects of the present invention.

FIGS. 7A-7C show various configurations by which a GUID generator service may be supported in various failover scenarios in accordance with various aspects of the present invention. As discussed, in some environments, multiple processing entities may service GUID requests in parallel, and based on the configuration may ensure that there are no duplications. Because GUID creation and distribution may be done by parallel entities, it may be appreciated that a system having high levels of request inputs may be provided to support multiple entities that request GUID information. For instance, in a commercial transaction system that supports millions of users, a highly parallel yet fault resistant system may be necessary to support such a transaction system. However, in other implementations, possibly only a single GUID generator may be necessary (e.g., for applications that are not time critical or require a high degree of fault tolerance). Therefore, according to various embodiments of the present invention, the GUID service may be configured in one or more operating modes.

FIGS. 7A-7C show various embodiments of different GUID service modes according to embodiments of the present invention. For example, FIG. 2A shows an active single mode where a single instance of the GUID service (e.g., GUID service 210) provides support and servicing of client requests (e.g. from client 201A). In what is referred to herein as an active/active configuration, a client (e.g., client 201B) sends a request to a load manager 221A that distributes requests to two or more GUID services (e.g. GUID service 220A, GUID service 220B). In this configuration, the load manager sends requests to multiple services, and replication ensures that each GUID service is consistent. FIG. 2C shows an active/standby configuration where one GUID service (e.g., GUID service A 230A) receives and processes requests through an active port, and where one or more other GUID services (e.g., GUID service B 230B) remains "closed" and does not receive and process requests directly.

According to one embodiment of the present invention, it is appreciated that a GUID service may be configured using a virtualized environment with logical storage shared between virtual servers, and the GUID service may direct web service requests including database requests to an available virtual server suitable for servicing the request. For instance, the GUID service may direct the request to the most underutilized virtual server that is available. In another embodiment, requests may be stored in a common location accessible by multiple virtual servers, and therefore, replication of request data is not necessary between servers that share the common storage location. Further, upon failure of a particular server, another server may be tasked to service the request, accessing the request in common storage.

Figure 8:
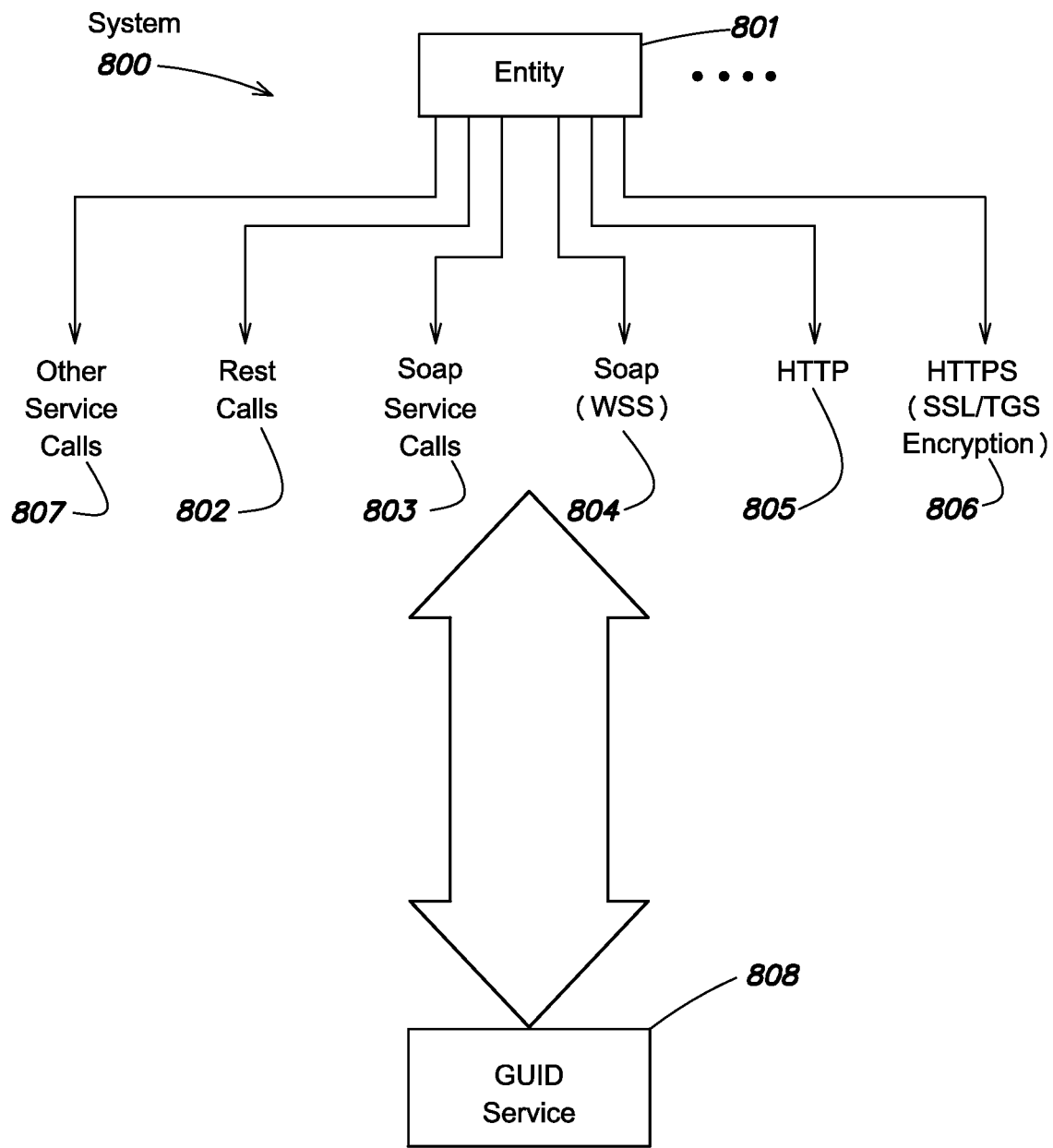
FIG. 8 shows various formats of GUID request according to various aspects of the present invention.

FIG. 8 shows a diagram of different GUID requests that may be serviced according to various embodiments of the present invention. For instance, a distributed system 800 may be used that includes an entity 801 that initiates one or more GUID requests that are serviced by a GUID service (e.g., GUID service 808). The service requests may include, but are not limited to, HTTPS (e.g., with SSL/TLS encryption) 806, HTTP requests 805, secure SOAP (e.g., using WS-Security or WSS) 804, SOAP service calls 803, REST calls 802, or other types of service requests 807. It should be appreciated that any type of request or message format may be used with various aspects of the present invention.

Figure 9:
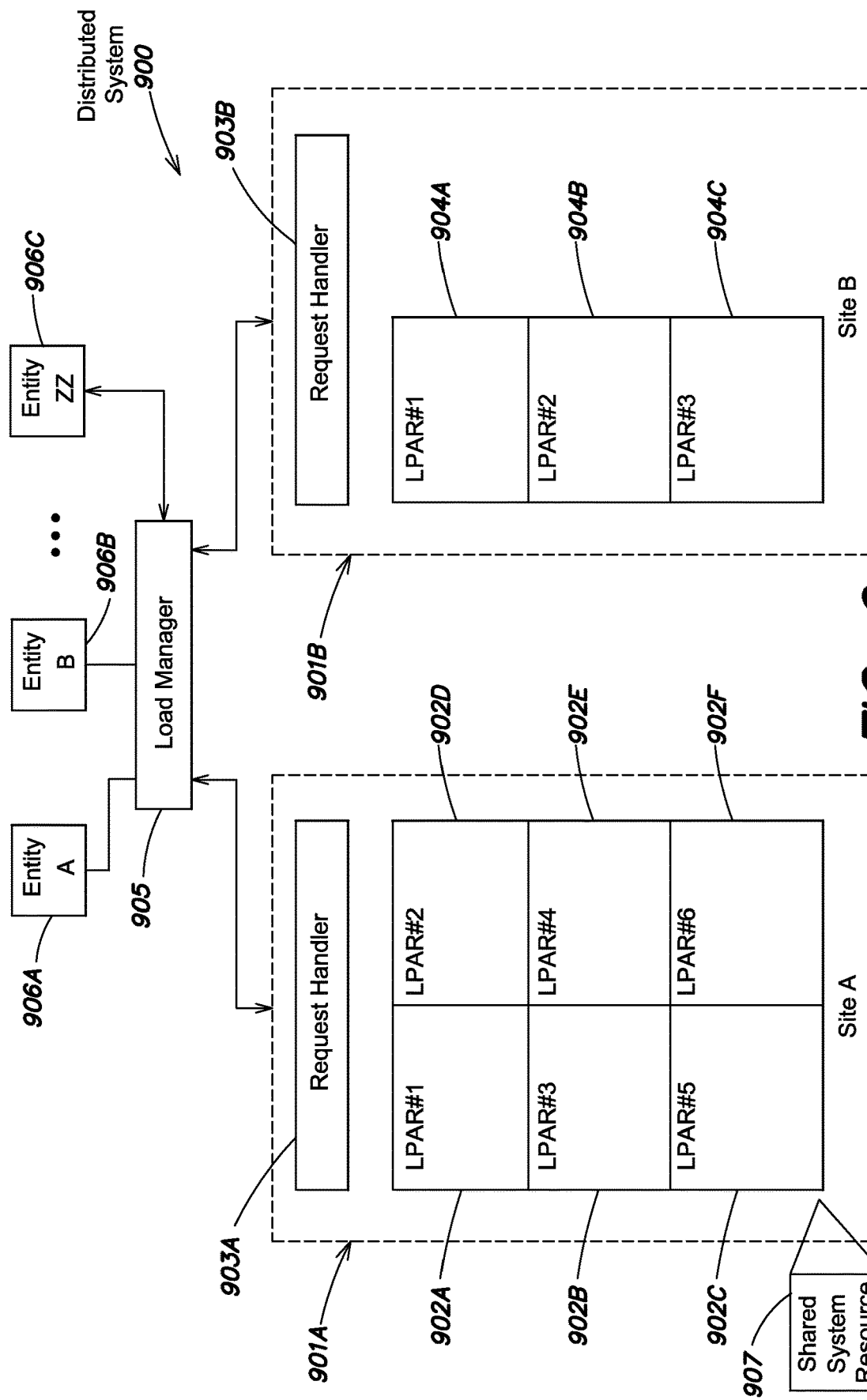
FIG. 9 is a block diagram of the system capable of servicing GUID request from one or more entities according to various aspects of the present invention.

FIG. 9 is a block diagram of a distributed system 900 capable of servicing GUID request from one or more entities according to various aspects of the present invention. For example, a distributed system 900 may be provided that services one or more GUID requests according to various embodiments of the present invention. System 900 includes one or more systems that operate to receive and process GUID requests.

System 900 may also include a load manager 905 that directs received requests to one or more systems for processing. Each system may also include a request handler (e.g., request handlers 903A, 903B) that determines, within the system, what systems will be processing each request. In one example implementation, a number of servers are configured to receive requests directed to them from a designated request handler. Each of the servers may be provided access to a logical storage system where transactions may be committed.

Further, requests that are received by the request handler 604 may be stored within a common area whereby servers may access and process received GUID generation requests. If a failure occurs, and the request is not processed, another server may be capable of servicing the request. The distributed system may use a common outward-facing URI for receiving GUID generation requests from one or more entities (e.g., client systems).

Further, FIG. 9 shows one example implementation of a database service using logical partitions distributed among multiple sites according to one embodiment of the present invention. In particular, it should be appreciated that a GUID service may be implemented within a system having logical partitions. A logical partition (LPAR) is the division of a computer processor, memory, and storage into multiple sets of resources so that each set of resources can be operated independently with its own operating system instance and applications. A logical partition may be defined that exists on a single computer system or group of computer systems. For example, many systems, including but not limited to stand-alone computer systems, groups of computers, clusters, mainframes, and other types of systems may use logical partitions.

As shown in FIG. 9, distributed system 900 may include a number of data centers each having one or more request handlers and logical partitions. For instance, a GUID service in site A (item 901A) may include a request handler (TCP/SD) 903A. Further, a site B (item 901B) may include a similar request handler (TCP/SD) 903B. Such handlers may receive requests and allocate them to processing entities to be serviced. According to one aspect of the present invention, it is appreciated that multiple processing entities within a site may be configured to provide GUID information in parallel, and to ensure uniqueness of GUID information, it may be beneficial that information be shared among the entities (e.g., as a shared system resource 907). In one embodiment, shared time information may be used to generate GUID information, such as by a centrally accessed system time. Because time is centrally accessed among the multiple entities, it may be used to help ensure uniqueness among GUIDs. For GUIDs that are generated by one or more processing entities within a site at the same system time, a centrally shared counter or other arbiter facility may be used to create site-specific unique information that can be used to determine a particular GUID.

As discussed, a GUID service may include one or more servers or other processing entities that are capable of processing requests. For instance, as discussed, such entities may include logical partitions or LPARs. In the example shown, site A may include a number of LPARs (e.g., LPAR #1-LPAR #6 (items 902A-902F)) that are adapted to receive and process requests from request handler 903A. Further, in the example shown, site B may include a number of LPARs (e.g., LPAR #1-LPAR #3 (items 904A-904C)) that are adapted to receive and process requests from request handler 903B. According to one embodiment, users, organizations, applications or other entities may be assigned to a particular GUID service, and that GUID service may have an assignment of particular resources (e.g., LPARs, storage, etc.) to fulfill the service requirements for requests including GUID requests associated with the service. Such resources may be allocated to particular entities using, for example, a management interface that is used to set up the GUID service for a particular entity.

Example Computer Implementations

Processes described above are merely illustrative embodiments of systems that may be used to process database service requests. Such illustrative embodiments are not intended to limit the scope of the present invention, as any of numerous other implementations for performing the invention. None of the claims set forth below are intended to be limited to any particular implementation of a GUID system, unless such claim includes a limitation explicitly reciting a particular implementation.

Processes and methods associated with various embodiments, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. According to one embodiment, the computer-readable medium may be non-transitory in that the computer-executable instructions may be stored permanently or semi-permanently on the medium. Such signals may define instructions, for example, as part of one or more programs, that, as a result of being executed by a computer, instruct the computer to perform one or more of the methods or acts described herein, and/or various embodiments, variations and combinations thereof.

Such instructions may be written in any of a plurality of programming languages, for example, Java, C, C#, or C++, Fortran, Pascal, Basic, machine languages, COBOL, etc., or any of a variety of combinations thereof. The computer-readable medium on which such instructions are stored may reside on one or more of the components of a general-purpose computer described above, and may be distributed across one or more of such components. Such instructions may be implemented on a specialized, specific computer system that provides GUID generation functions. Such a computer-based system may include hardware, software or a combination thereof that allows the computer to perform one or more functions as described above.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Various embodiments according to the invention may be implemented on one or more computer systems. These computer systems may be, for example, computers such as those based on Intel, Motorola, Hewlett-Packard, ARM Cortex, Qualcomm Scorpion type processors or any other type of processor. It should be appreciated that one or more of any type computer system may be used to perform GUID generation functions according to various embodiments of the invention. Further, the system may be located on a single computer or may be distributed among a plurality of computers attached by a communications network.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

A computer system may be a general-purpose computer system that is programmable using a high-level computer programming language. Computer system may be also implemented using specially programmed, special purpose hardware including a processor or controller. Such a processor usually executes an operating system which may be, for example, the Windows 7 or Windows 8 operating systems available from the Microsoft Corporation, MAC OS X Snow Leopard, MAC OS X Lion operating systems available from Apple Computer, iOS, Blackberry OS, Windows Mobile or Android OS operating systems, or UNIX available from various sources. Many other operating systems may be used.

Some aspects of the invention may be implemented as distributed application components that may be executed on a number of different types of systems coupled over a computer network. Some components may be located and executed on mobile devices, servers, tablets, or other system types. Other components of a distributed system may also be used, such as databases (e.g., the DB2 database, SQL databases, the mongoDB database, etc.), cloud services, or other component types.

The processor and operating system together define a computer platform for which application programs in high-level programming languages are written. It should be understood that the invention is not limited to a particular computer system platform, processor, operating system, or network. Further, it should be appreciated that multiple computer platform types may be used in a distributed computer system that implement various aspects of the present invention. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP). Certain aspects of the present invention may also be implemented on a cloud-based computer system (e.g., the EC2 cloud-based computing platform provided by Amazon.com), a distributed computer network including clients and servers, or any combination of systems.

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as Java, C++, or C# (C-Sharp). Other object-oriented programming languages may also be used. Alternatively, functional, machine language, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Further, on each of the one or more computer systems that include one or more components of distributed system 100, each of the components may reside in one or more locations on the system. For example, different portions of the components of system 100 may reside in different areas of memory (e.g., RAM, ROM, disk, etc.) on one or more computer systems. Each of such one or more computer systems may include, among other components, a plurality of known components such as one or more processors, a memory system, a disk storage system, one or more network interfaces, and one or more busses or other internal communication links interconnecting the various components.

Figure 10:
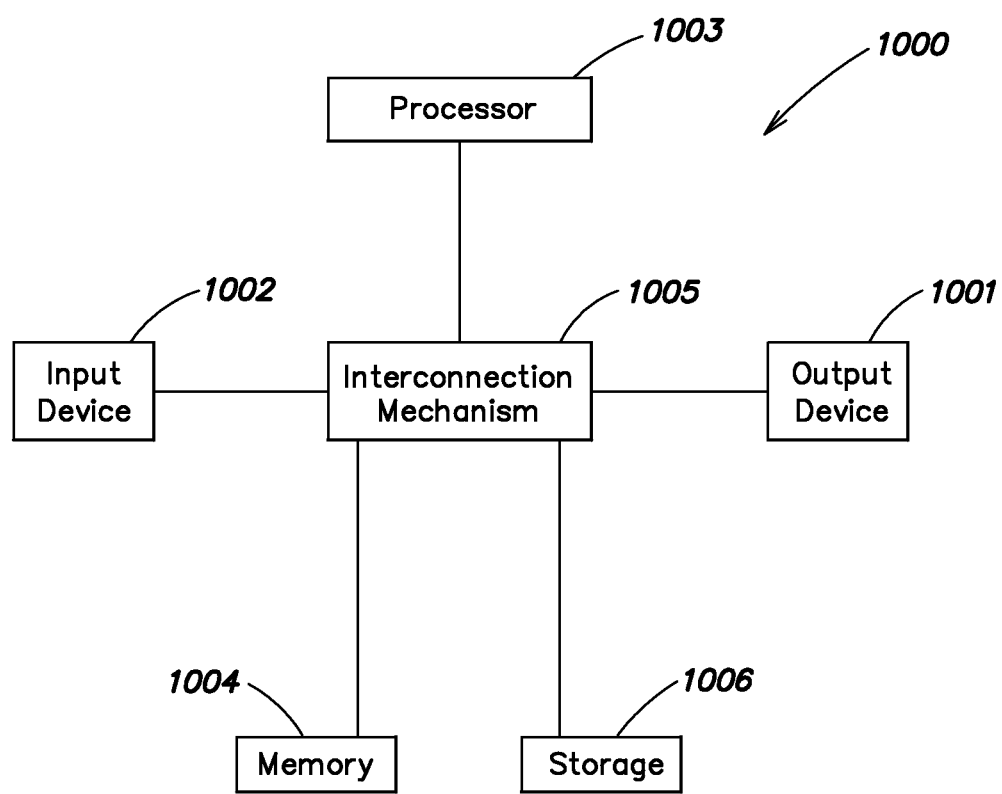
FIG. 10 shows an example computer system upon which various aspects of the present invention may be practiced.
Figure 11:
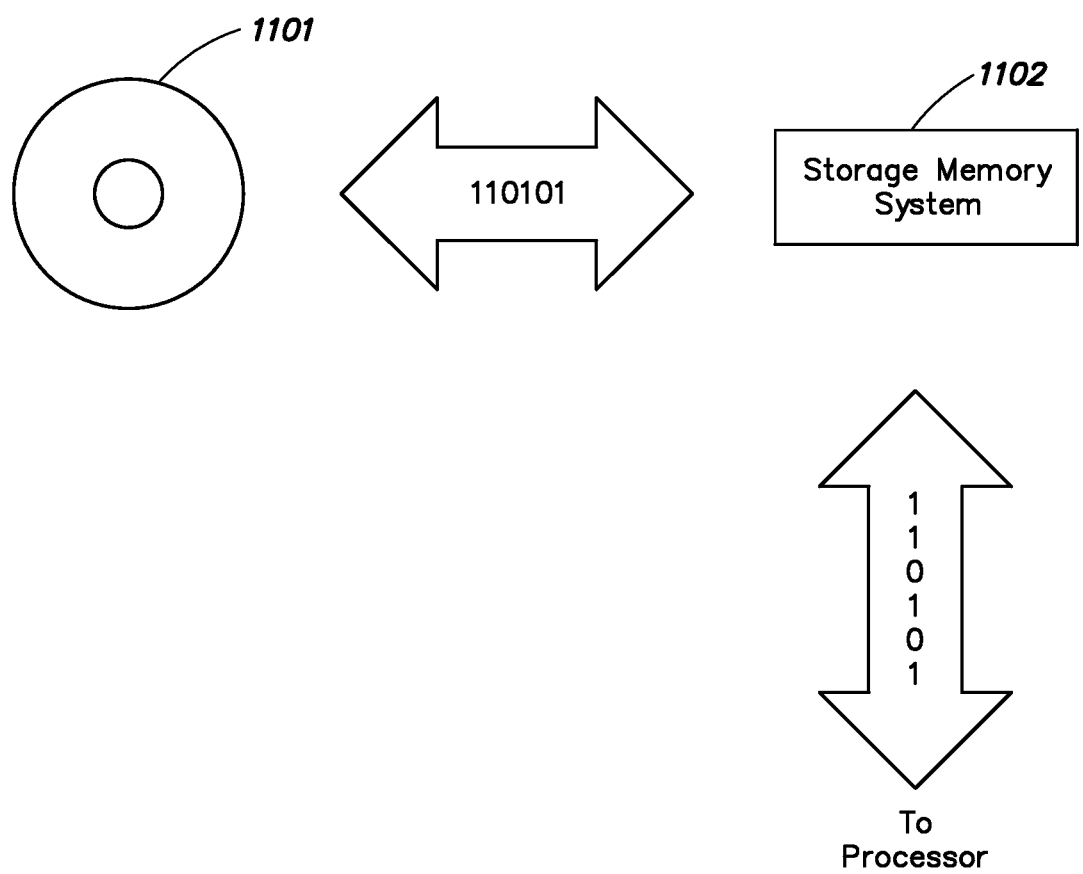
FIG. 11 shows an example storage system and may be used to store data according to various aspects of the present invention.

Any number of systems of system 100 may be implemented on a computer system described below in relation to FIGS. 10 and 11. In particular, FIG. 10 shows an example computer system 1000 used to implement various aspects. FIG. 11 shows an example storage system that may be used.

System 1000 is merely an illustrative embodiment of a computer system suitable for implementing various aspects of the invention. Such an illustrative embodiment is not intended to limit the scope of the invention, as any of numerous other implementations of the system, for example, are possible and are intended to fall within the scope of the invention. For example, a virtual computing platform may be used. None of the claims set forth below are intended to be limited to any particular implementation of the system unless such claim includes a limitation explicitly reciting a particular implementation.

For example, various aspects of the invention may be implemented as specialized software executing in a computer system 1000 such as that shown in FIG. 10. The computer system 1000 may include a processor 1003 connected to one or more memory devices 1004, such as a disk drive, memory, or other device for storing data. Memory 1004 is typically used for storing programs and data during operation of the computer system 1000. Components of computer system 1000 may be coupled by an interconnection mechanism 1005, which may include one or more busses (e.g., between components that are integrated within a same machine) and/or a network (e.g., between components that reside on separate discrete machines). The interconnection mechanism 1005 enables communications (e.g., data, instructions) to be exchanged between system components of system 1000. Computer system 1000 also includes one or more input devices 1002, for example, a keyboard, mouse, scanner, trackball, microphone, touch screen, and one or more output devices 1001, for example, a printing device, display screen, and/or speaker. The system may also include any specialized components depending on the application, including any barcode reader, magnetic stripe reader, receipt printer, hand-held or fixed scanners, pin entry devices (PED), or other device types. In addition, computer system 1000 may contain one or more interfaces (not shown) that connect computer system 1000 to a communication network (in addition or as an alternative to the interconnection mechanism 1005).

The storage system 1006, shown in greater detail in FIG. 11, typically includes a computer readable and writeable nonvolatile recording medium 1101 in which signals are stored that define a program to be executed by the processor or information stored on or in the medium 1101 to be processed by the program. The medium may, for example, be a disk or flash memory. Storage system 1006 may also include logical storage comprising a number of physical storage elements. Typically, in operation, the processor causes data to be read from the nonvolatile recording medium 1101 into another memory 1102 that allows for faster access to the information by the processor than does the medium 1101. This memory 1102 is typically a volatile, random access memory such as a dynamic random access memory (DRAM) or static memory (SRAM). It may be located in storage system 1006, as shown, or in memory system 1004, not shown. The processor 1003 generally manipulates the data within the integrated circuit memory 1004, 1102 and then copies the data to the medium 1101 after processing is completed. A variety of mechanisms are known for managing data movement between the medium 1101 and the integrated circuit memory element 1004, 1102, and the invention is not limited thereto. The invention is not limited to a particular memory system 1004 or storage system 1006.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 1000 is shown by way of example as one type of computer system upon which various aspects of the invention may be practiced, it should be appreciated that aspects of the invention are not limited to being implemented on the computer system as shown in FIG. 10. Various aspects of the invention may be practiced on one or more computers having a different architecture or components that that shown in FIG. 10.

It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP). It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as Java, C++, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented using various Internet technologies such as, for example, the well-known Common Gateway Interface (CGI) script, PHP Hyper-text Preprocessor (PHP), Active Server Pages (ASP), HyperText Markup Language (HTML), Extensible Markup Language (XML), Java, JavaScript, Asynchronous JavaScript and XML (AJAX), Flash, and other programming methods. Further, various aspects of the present invention may be implemented in a cloud-based computing platform, such as the well-known EC2 platform available commercially from Amazon.com, Seattle, Wash., among others. Various aspects of the invention may be implemented as programmed or non-programmed elements, or any combination thereof.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for generating a plurality of globally-unique identifiers (GUIDs), the system comprising:
   a memory;
   an interface adapted to receive one or more requests for at least one GUID from at least one of a plurality of executing applications;
   a first processing component configured to generate, based on the one or more requests, a first GUID among the plurality of GUIDs; and
   a second processing component configured to generate a second GUID among the plurality of GUIDs,
   wherein the interface is further configured to communicate the first GUID to the at least one of the plurality of executing applications, and
   wherein each one of the GUIDs generated by the first processing component and each one of the GUIDs generated by the second processing component is unique and determined based on:
      a first site identifier unique to the location of the first processing component for GUIDs generated by the first processing component, a second site identifier unique to the location of the second processing component for GUIDs generated by the second processing component,
an absolute time value, and
a counter shared between the first processing component and the second processing component.

2. The system according to claim 1, wherein the one or more requests for at least one GUID are alternatively processed by the first processing component and the second processing component.

3. The system according to claim 1, wherein the counter is located in a shared memory associated with the first processing component and the second processing component.

4. The system according to claim 1, wherein the absolute time value is shared between the first processing component and the second processing component.

5. The system according to claim 4, wherein the absolute time value includes a shared system clock that is shared by the first processing component and the second processing component.

6. The system according to claim 4, wherein the counter is incremented upon the generation of at least two GUIDs having a same indication of time value.

7. The system according to claim 1, wherein the one or more requests each comprises a command specifying an output format of the at least one GUID, and wherein the command indicates at least one of a plurality of selectable formats specified by at least one requesting entity.

8. The system according to claim 7, wherein the first processing component generates the requested at least one GUID based on information within the command indicating at least one of a plurality of selectable formats.

9. The system according to claim 8, wherein the plurality of selectable formats includes at least one of:
a plain hexadecimal format;
a conventional GUID format;
an ESS format;
and a B64B format.

10. The system according to claim 7, wherein the command specifies whether the generated at least one GUID is journaled to a central database of GUIDs.

11. A system for generating a plurality of globally-unique identifiers (GUIDs), the system comprising:
a memory;
an interface adapted to receive at least one request for multiple GUIDs from at least one plurality of requesting entities, wherein the at least one request includes an indication of a request for generating the multiple GUIDs; and
a first processing component that adaptively generates the requested multiple GUIDs, wherein the interface is adapted to communicate the multiple GUIDs to the at least one of the requesting entities, wherein each one of the requested multiple GUIDs is unique and determined based on:
a site identifier unique to the location of the processing component,
an absolute time value shared between the first processing component and a second processing component, and
a counter shared between the first processing component and the second processing component.

12. The system according to claim 11, wherein the first processing component is adapted to generate the requested multiple GUIDs within a single processing action.

13. The system according to claim 11, wherein the first processing component is adapted to generate the requested multiple GUIDs within a single clock cycle.

14. The system according to claim 11, wherein the first processing component is adapted to generate a data structure including the multiple GUIDs.

15. The system according to claim 11, wherein the first processing component is adapted to generate the requested multiple GUIDs responsive to a single request to generate the multiple GUIDs.

16. A method comprising:
receiving one or more requests for at least one of a plurality of globally-unique identifiers (GUIDs) from at least one of a plurality of executing applications;
adaptively generating, by a first processor, the requested at least one GUID, wherein the interface is adapted to communicate the at least one GUID to the at least one of the plurality of executing applications;
adaptively generating, by a second processor, at least one other GUID among the plurality of GUIDs, wherein each one of the plurality of GUIDs generated by the first processor and the second processor is unique and determined based on:
a first site identifier unique to the location of the first processor for GUIDs generated by the first processor,
a second site identifier unique to the location of the second processor for GUIDs generated by the second processor,
an absolute time value, and
a counter shared between the first processor and the second processor.

17. The method according to claim 16, wherein the one or more requests for at least one GUID are alternatively processed by the first processor and the second processor.

18. The method according to claim 16, wherein the counter is located in a shared memory associated with the first processor and the second processor.

19. The method according to claim 16, wherein the absolute time value includes a shared system clock that is shared by the first processor and the second processor.

20. The method according to claim 19, further comprising an act of changing a value of the counter responsive to a generation of at least two GUIDs having a same indication of time value.

* * * * *